US012110849B2

(12) United States Patent
Link

(10) Patent No.: US 12,110,849 B2
(45) Date of Patent: Oct. 8, 2024

(54) ACOUSTIC COMPONENT AND AIR ROUTING LINE HAVING AN ACOUSTIC COMPONENT

(71) Applicant: MANN+HUMMEL GmbH, Ludwigsburg (DE)

(72) Inventor: Andreas Link, Mundelsheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/889,592

(22) Filed: Aug. 17, 2022

(65) Prior Publication Data

US 2022/0389892 A1 Dec. 8, 2022

Related U.S. Application Data

(63) Continuation of application No. PCT/EP2021/050935, filed on Jan. 18, 2021.

(51) Int. Cl.

| | |
|---|---|
| ***F02M 35/12*** | (2006.01) |
| ***F01N 1/02*** | (2006.01) |
| ***F02M 35/10*** | (2006.01) |
| ***F16L 55/033*** | (2006.01) |

(52) U.S. Cl.

CPC .. *F02M 35/1211* (2013.01); *F02M 35/10262* (2013.01); *F02M 35/1216* (2013.01)

(58) Field of Classification Search

CPC ... F16L 55/033; F16L 55/02; F16L 55/02727; F16L 55/0331; F15D 1/02; F15D 1/06; F15D 1/065; G10K 11/16; F01N 1/02; F01N 1/026; F01N 1/04; F02M 35/12; F02M 35/1211; F02M 35/1216; F02M 35/1255; F02M 35/1261; F02M 35/10262; F02M 35/1277; F02M 35/10295; F02M 35/10

See application file for complete search history.

(56) References Cited

U.S. PATENT DOCUMENTS 2,047,443 A 7/1936 Starkweather et al.
5,869,792 A 2/1999 Allen et al.
7,497,301 B2 * 3/2009 Cheng ................ F02M 35/1255 181/248
7,506,722 B2 * 3/2009 Emler ..................... F01N 1/023 181/251

(Continued)

FOREIGN PATENT DOCUMENTS

CN 111219228 A * 6/2020 ............... F01N 1/02
DE 1787439 U 4/1959

(Continued)

*Primary Examiner* — Edgardo San Martin

(57) ABSTRACT

An acoustic component is provided with a flow channel for a fluid. The flow channel has an inlet pipe and an outlet pipe. A flow channel section is arranged between the inlet pipe and the outlet pipe, wherein the flow channel section has a silencer volume connected in the flow channel section via openings to the flow channel. A flow deflection device is arranged at least in the flow channel section with the silencer volume, wherein the flow deflection device deflects a flow of the fluid in the flow channel section with the silencer volume away from the openings. The openings in the flow channel section are arranged in a sheltered zone of the flow deflection device.

13 Claims, 5 Drawing Sheets

(56) References Cited

U.S. PATENT DOCUMENTS

| | | | | |
|---|---|---|---|---|
| 8,707,689 | B1 * | 4/2014 | Spencer-Smith | F01N 13/082 60/324 |
| 9,010,485 | B2 * | 4/2015 | Bornemann | F02M 35/1266 123/184.57 |
| 9,309,843 | B2 * | 4/2016 | Hwang | F02M 35/1233 |
| 9,625,077 | B2 * | 4/2017 | Barbolini | F16L 55/033 |
| 11,118,544 | B2 * | 9/2021 | Poisson | F02M 35/10144 |
| 11,255,303 | B2 * | 2/2022 | Satarino | F16L 55/02763 |
| 2005/0161283 | A1 * | 7/2005 | Emler | F01N 1/023 181/227 |
| 2007/0107982 | A1 * | 5/2007 | Sullivan | F01N 1/06 181/251 |
| 2007/0292816 | A1 | 12/2007 | Miller | |
| 2010/0193282 | A1 * | 8/2010 | Kim | F02M 35/10157 181/248 |
| 2011/0299981 | A1 | 12/2011 | Li et al. | |
| 2012/0222643 | A1 | 9/2012 | Jasnie et al. | |
| 2022/0389892 | A1 * | 12/2022 | Link | F02M 35/1255 |

FOREIGN PATENT DOCUMENTS

| | | | | | |
|---|---|---|---|---|---|
| DE | 4128386 | A1 | | 3/1993 | |
| DE | 102009024728 | A1 | | 12/2010 | |
| DE | 102011089183 | A1 | | 6/2013 | |
| DE | 202014007986 | U1 | * | 2/2016 | F01N 1/026 |
| EP | 1780398 | A1 | | 5/2007 | |
| FR | 2278936 | A1 | | 2/1976 | |
| JP | 2010216340 | A | * | 9/2010 | F01N 1/04 |

* cited by examiner

ACOUSTIC COMPONENT AND AIR ROUTING LINE HAVING AN ACOUSTIC COMPONENT

CROSS-REFERENCE TO RELATED APPLICATIONS

This application is a continuation application of international application No. PCT/EP2021/050935 having an international filing date of 18 Jan. 2021 and designating the United States, the international application claiming a priority date of 17 Feb. 2020 based on prior filed German patent application No. 10 2020 104 034.2, the entire contents of the aforesaid international application and the aforesaid German patent application being incorporated herein by reference.

BACKGROUND OF THE INVENTION

The invention concerns an acoustic component and an air routing line with an acoustic component, in particular for an internal combustion engine.

It is known to provide flow conduits, for example, air routing lines, in particular charge air ducts of internal combustion engines, with acoustic measures for noise reduction. For example, silencer volumes, for example, of the type of broad-band silencers with resonator chambers, are often used.

Such a broad-band silencer is known from DE202014007986U1, for example.

The installation space, in particular in vehicles, is limited so that the components, if possible, are reduced in size. With reduced pipe diameters, the flow rate increases according to the reduced pipe diameter in the broad-band silencer which, in turn, generates new requirements in respect to the acoustic measures.

SUMMARY OF THE INVENTION

The invention has the object to improve an acoustic component for higher flow rates.

A further object is providing an air routing line with an acoustic component for higher flow rates.

The aforementioned object is solved according to an aspect of the invention by an acoustic component with a flow channel for a fluid, in particular air, wherein between an inlet pipe and an outlet pipe of the flow channel at least one flow channel section with a silencer volume is arranged that is connected in the flow channel section via openings to the flow channel, and wherein at least in the flow channel section with the silencer volume at least one flow deflection device is provided that deflects a flow of the fluid in the flow channel section with the silencer volume at least away from the openings, and wherein the openings in the flow channel section are arranged in a sheltered zone of the flow deflection device.

The flow deflection device effects a deflection or a detachment of the fluid flow from the wall surface of the flow channel. This detachment of the flow has the result that the openings in the flow channel section are located outside of the core flow and are not subjected to inflow. The openings are arranged in the wake region of the flow, also referred to as dead water region. The openings are thus arranged in the flow channel section in a sheltered zone of the flow deflection device.

The further object is solved by an air routing line with an acoustic component according to the invention for an internal combustion engine, wherein the acoustic component is arranged at a clean air side of an air inlet or wherein the acoustic component is arranged at a raw air side of an air inlet.

Beneficial configurations and advantages of the invention result from the additional claims, the description, and the drawing.

An acoustic component is proposed with a flow channel for a fluid, in particular air, wherein between an inlet pipe and an outlet pipe of the flow channel at least one flow channel section with a silencer volume is arranged that is connected in the flow channel section via openings to the flow channel, and wherein at least in the flow channel section with the silencer volume at least one flow deflection device is provided that deflects a flow of the fluid in the flow channel section with the silencer volume at least away from the openings, and wherein the openings in the flow channel section are arranged in a sheltered zone of the flow deflection device.

Advantageously, a whistling noise that may occur at higher flow rates can be avoided. In acoustic components, especially broad-band silencers, for example, in the clean air conduit, whistling noises may occur in certain operational states. This is caused by the interaction of the core flow with the volume of the silencer through the openings via which the one or plurality of resonator chambers arranged about the flow channel, i.e., the silencer volume, communicate with the flow channel.

Whistling is understood as a noise with a tonal character. A whistling tone constitutes a narrow-band event in the frequency spectrum that stands out significantly against a possible broad-band background noise, usually in a magnitude of 10 dB to 20 dB. The frequency range in which a background noise is perceived as whistling or howling extends across the entire audible range, i.e., approximately in a frequency range of 500-16,000 Hz. Due to its narrow-band property, the noise is very well noticed by the human ear and is correspondingly perceived as disturbing.

The invention is not limited to broad-band silencers but can also be used in connection with other resonators, for example, Helmholtz resonators or pipe resonators.

Complex measures for avoiding disturbing noises can be avoided such as, for example, the reduction of the opening cross section which changes the actual acoustic performance of the component, covering the openings with a fine mesh grid which causes additional costs, or the enlargement of the complete pipe cross section in order to reduce the flow rate which costs installation space that is usually not available.

Since the flow is guided away or is detached from the openings in the wall of the flow channel at least partially prior to the flow contacting again the wall of the flow channel at an axial distance from the flow deflection device, disturbing noises such as whistling can be reduced efficiently without changing the usual acoustic properties of the acoustic component.

The openings can be arranged behind the flow deflection device, for example, a step, or adjacent to the flow deflection device, for example, a longitudinal stay. Different flow deflection devices can also be combined, for example, a step and one or a plurality of longitudinal stays. Also, a plurality of longitudinal stays can be provided in the flow channel section with the silencer volume.

Advantageously, disturbing noises can be prevented when, for example, at least in the flow channel section of the openings, the diameter (in case of cylindrical configuration) or the cross section (in particular in case of non-cylindrical configuration) of the flow channel is at least partially expanded. In this way, the flow can lift off the openings and, in this way, a whistling noise, for example, can be effectively prevented.

For example, the openings of the broad-band silencer can be placed behind a step and/or between longitudinal stays.

No additional components are required so that no additional costs are generated. The flow deflection device can be integrated simply in an injection molding process when producing the acoustic component. The acoustic effectiveness of the acoustic component, in particular the damping action, remains unaffected. Moreover, a pressure loss due to narrowed cross sections can be avoided because no cross sections must be narrowed. The flow deflection device is effective for different geometries of the openings.

The openings can be designed arbitrarily as round holes, slotted holes, slots, parallel to the longitudinal axis, perpendicular to the longitudinal axis, at a slant to the longitudinal axis, or combinations of different configurations of openings.

A robust, easily manufactured measure can be provided that reduces disturbing noises, in particular whistling noises in broad-band silencers, without reducing the acoustic damping action and, at the same time, does not trigger an increase of the pressure loss.

According to a beneficial configuration of the acoustic component, the at least one flow deflection device can be provided at least at the transition of the inlet pipe into the flow channel section with the silencer volume. In this way, a compact configuration of the acoustic component is possible.

According to a beneficial configuration of the acoustic component, the flow deflection device can be configured so as to be substantially ineffective with respect to damping. The expansion of the diameter or of the cross section does not act in the sense of an acoustic expansion chamber. Rather, the flow deflection device alone would cause practically no damping effect like an expansion chamber.

According to a beneficial embodiment of the acoustic component, the outlet pipe can comprise the same or a larger diameter and/or the same or a larger cross section than the flow channel section with the silencer volume. When the flow channel section with the silencer volume is embodied conically with increasing diameter or cross section in flow direction, the same or a larger diameter and/or cross section of the outlet pipe is provided at least at the transition of the flow channel section with the silencer volume to the outlet pipe.

In addition or as an alternative, according to a beneficial embodiment of the acoustic component, the flow channel in the flow channel section with the silencer volume can comprise a larger diameter and/or cross section than in the inlet pipe.

In both cases, in contrast to conventional expansion chambers in which the cross section of the flow channel at the outlet of the expansion chambers usually tapers, the flow channel in the outlet pipe is at least as large as in the flow channel section with the silencer volume.

According to a beneficial embodiment of the acoustic component, the flow deflection device can comprise at least one step. The step is embodied significantly smaller than in a conventional expansion chamber. In particular, the step can be substantially embodied with a sharp edge. This facilitates lifting off of the flow from the wall with the openings in the flow channel section with the silencer volume.

According to a beneficial embodiment of the acoustic component, the step can be designed to extend circumferentially about the flow channel. Optionally, the step can also be interrupted in circumferential direction so that step segments result. The latter can be arranged equidistantly distributed about the circumference. According to a beneficial embodiment of the acoustic component, the flow deflection device can comprise at least one longitudinal stay projecting into the flow channel which extends along a longitudinal axis in axial direction along the flow channel section with the silencer volume. In particular, the at least one longitudinal stay can extend in axial direction at least across an axial extension of the openings. The longitudinal stays which are introduced at the inner side of the pipe between the openings in longitudinal direction enhance the effect of "lifting off" of the flow.

Optionally, one or a plurality of longitudinal stays can also be provided without step at the inlet of the flow channel section with the silencer volume. This has the effect that the flow is lifted off of the openings by the longitudinal stay or stays. The longitudinal stays can be embodied narrow or wide. When only the longitudinal stays without step are provided, the diameter of the flow channel and thus of the inlet pipe and of the outlet pipe can remain unchanged across the extension length, i.e., across the flow channel section with the silencer volume. This has the advantage that neither the inner diameter of the pipe nor the volume of the acoustically active silencer volume must be reduced. The longitudinal stays, so to speak, are only placed onto the existing inner radius of the flow channel section with the silencer volume.

According to a beneficial embodiment of the acoustic component, a plurality of longitudinal stays can be arranged in the flow channel section about the longitudinal axis.

Advantageously, the longitudinal stays, with or without step at the inlet in the flow channel section with the silencer volume, can be arranged between the openings and can project into the flow channel in the manner of fins. Beneficially, a longitudinal stay extends in circumferential direction across at least 10° or at least across the same angle range as an adjacently arranged opening or row of openings in longitudinal direction of the flow channel section with the silencer volume. This has advantageous effects for the manufacture of the acoustic component because the flow channel section with the silencer volume is mechanically stabilized.

According to a beneficial embodiment of the acoustic component, two or more flow deflection devices with flow channel sections with silencer volumes can be arranged sequentially along a longitudinal axis. This enables a beneficial adaptation of the structures for damping in certain frequency ranges. Optionally, in case of the presence of a plurality of sequentially arranged flow channel sections with silencer volume, only a portion of the flow channel sections may be furnished with a flow deflection device.

According to a further aspect of the invention, an air routing line is proposed with an acoustic component according to the invention for an internal combustion engine, wherein the acoustic component is arranged at a clean air side of an air inlet or wherein the acoustic component is arranged at a raw air side of an air inlet.

Advantageously, unpleasant disturbance noises such as whistling tones at high flow rates can be reliably prevented.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to meaningful further combinations.

DESCRIPTION OF PREFERRED EMBODIMENTS

Figure 1:
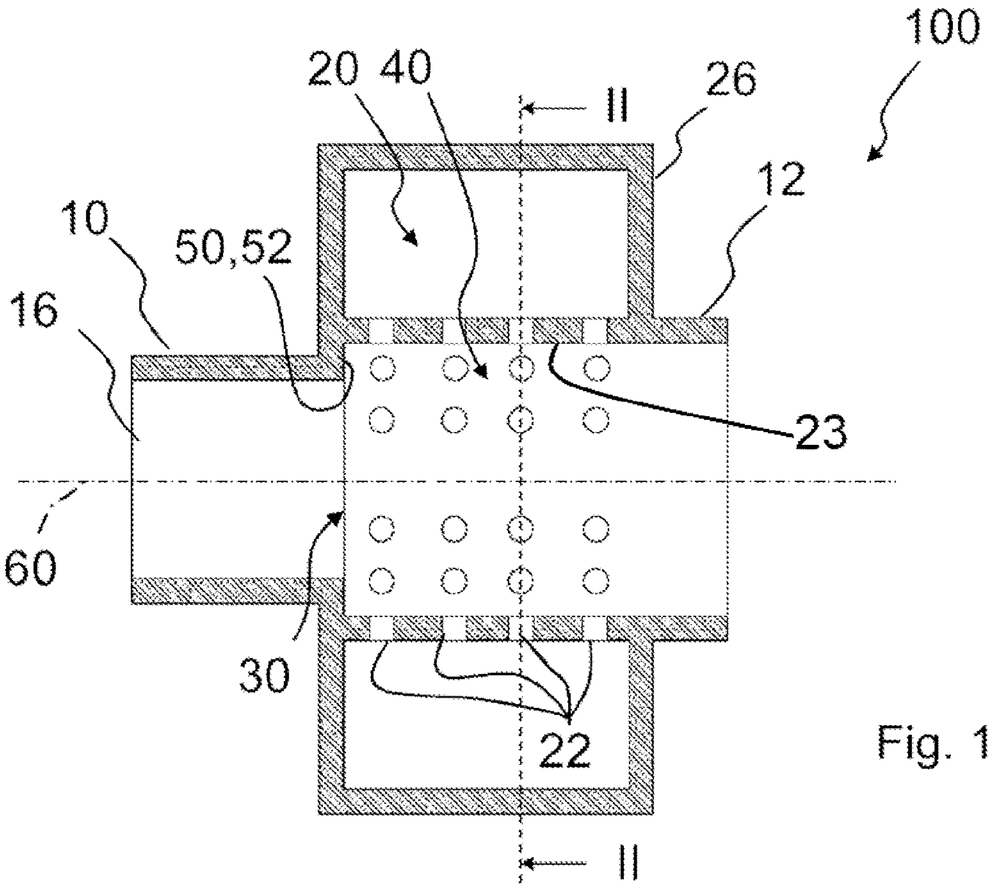
FIG. 1 shows a longitudinal section along an axial direction of an acoustic component according to an embodiment of the invention.

In the Figures, same or similar components are identified with same reference characters.

Figure 2:
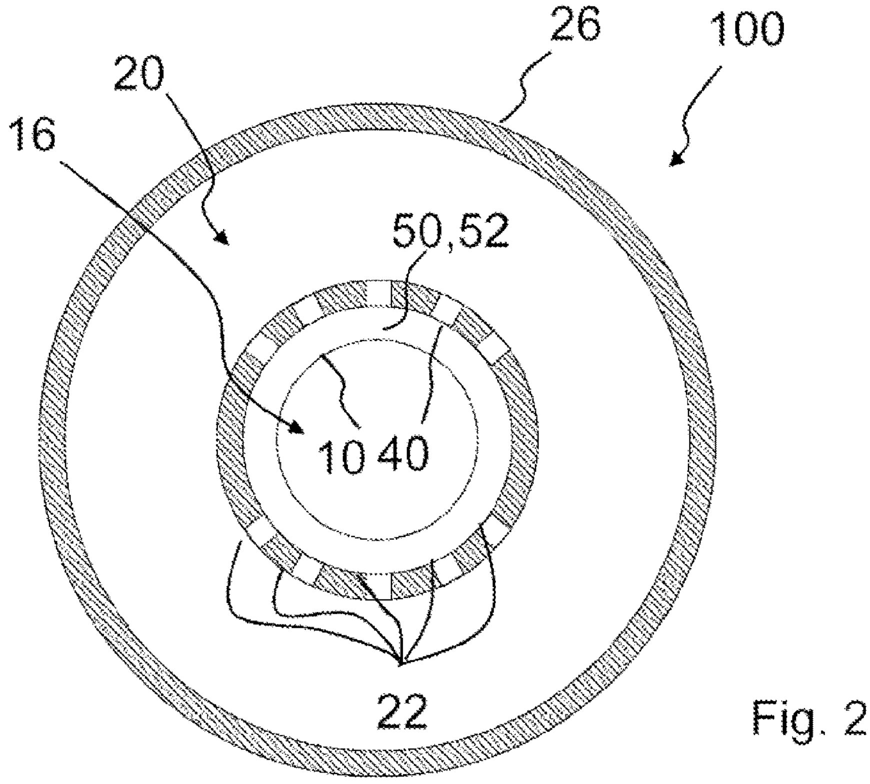
FIG. 2 shows a plan view of the section plane II-II through the acoustic component of FIG. 1.

FIGS. 1 and 2 show an acoustic component 100, in particular a resonator, also referred to herein as a silencer, according to an embodiment of the invention. FIG. 1 shows a longitudinal section along a longitudinal axis 60 in axial direction of the acoustic component 100, and FIG. 2 shows a plan view of the section plane II-II through the acoustic component 100 of FIG. 1.

The acoustic component 100 comprises a flow channel 16 for a fluid, in particular air, that is surrounded, for example, by cylindrical walls 23"

Between an inlet pipe 10 and an outlet pipe 12 of the flow channel 16, a flow channel section 40 with a resonator chamber 20 having an air-filled open interior (as shown in FIG. 1), also referred to as a silencer volume 20, the silencer volume is connected in the flow channel section 40 via openings 22 to the flow channel 16. The silencer volume 20 is closed off outwardly by a cover 26 forming a radially outer wall of the resonator chamber 20.

The openings 22 are identified only partially with reference characters for reasons of clarity. The flow channel 16 extends through the inlet pipe 10, the flow channel section 40 with silencer volume 20, and the outlet pipe 12.

At the transition 30 of the inlet pipe 10 into the flow channel section 40 with the silencer volume 20, a flow deflection device 50 in the form of a step 52 is provided such that the diameter of the flow channel 16 is enlarged in the flow channel section 40 with the silencer volume 20.

The openings 22 are arranged in the flow channel section 40 in a sheltered zone of the flow deflection device 50 formed as a step 52. The step 52 is arranged so as to extend circumferentially about the flow channel 16. The flow deflection device 50 is neutral in relation to the intended damping behavior of the acoustic component, i.e., is configured to be substantially ineffective with respect to damping.

The flow deflection device 50 deflects locally a flow of the fluid in the flow channel section 40 with the silencer volume 20 at the transition 30 away from the openings 22 toward the center of the flow channel 16 so that the flow lifts off of the openings 22 and only at some axial distance away from the step 52 reaches again the wall of the flow channel 16 where no openings 22 are existing anymore. For this purpose, a step 52 embodied with a sharp edge is particularly beneficial.

The flow deflection device 50 is oriented outwardly in this embodiment. The openings 22 comprise therefore, compared to the wall of the inlet pipe 10, a larger distance to the longitudinal axis 60.

Optionally, the flow deflection device 50 can however also be oriented inwardly, for example, in the form of a circumferentially extending or interrupted stay.

The height of the step or the expansion of the diameter can be adapted to the boundary conditions of the flow through the acoustic component 100 in practical use.

The outlet pipe 12 comprises the same diameter as the flow channel section 40 with the silencer volume 20. Optionally, the outlet pipe 12 can comprise a larger diameter than the flow channel section 40 with the silencer volume 20. In principle, the outlet diameter can however also be smaller again than at the step. In this case, the component can be manufactured of two component groups. The effectiveness of the measure is however maintained.

Figure 3:
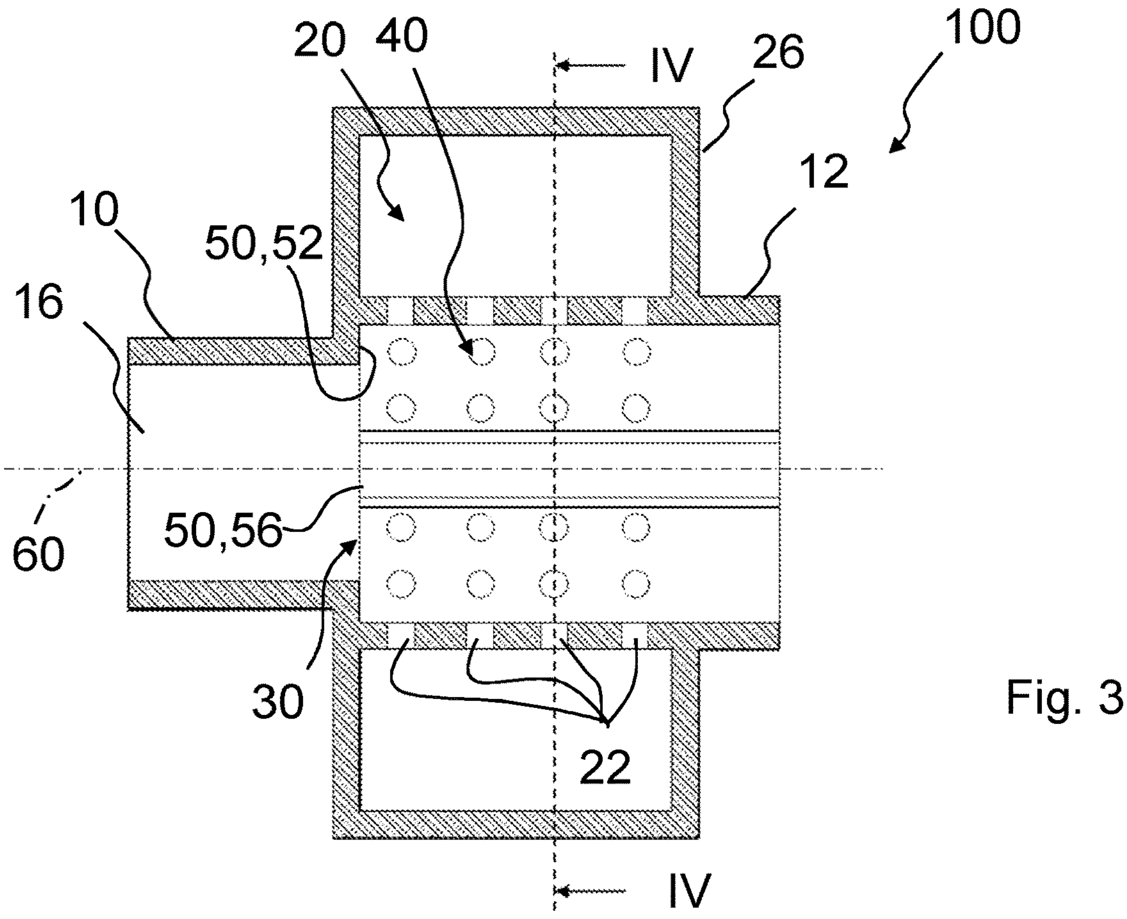
FIG. 3 shows a longitudinal section along an axial direction of an acoustic component according to a further embodiment of the invention.
Figure 4:
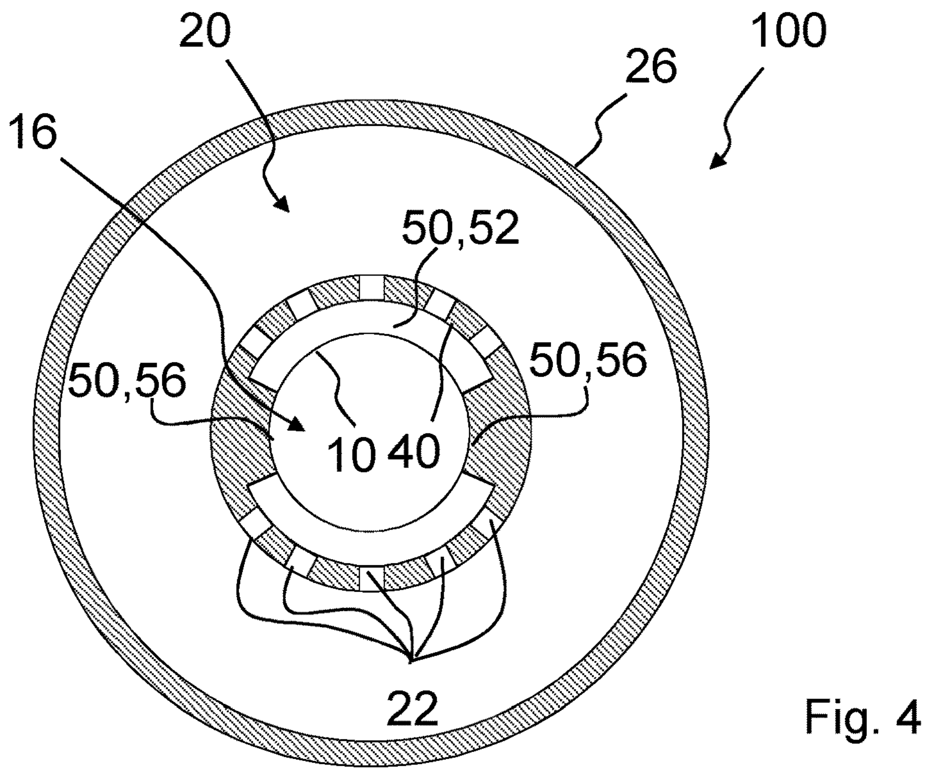
FIG. 4 shows a plan view of the section plane IV-IV through the acoustic component of FIG. 3.

FIGS. 3 and 4 illustrate an acoustic component 100 according to a further embodiment of the invention. FIG. 3 shows a longitudinal section along a longitudinal axis 60 in axial direction of the acoustic component 100, and FIG. 4 shows a plan view of the section plane IV-IV through the acoustic component 100 of FIG. 3. The configuration of the acoustic component 100 corresponds substantially to that of FIGS. 1 and 2, reference being had to their description for avoiding unnecessary repetitions.

In addition to the step 52 already described in connection with FIGS. 1 and 2 as a flow deflection device 50, the flow deflection device 50 comprises two diametrically oppositely positioned longitudinal stays 56 which project into the flow channel 16.

The longitudinal stays 56 extend in axial direction along the flow channel section 40 all the way to the outlet pipe 12 and cover in axial direction the axial extension of the openings 22 in the flow channel section 40 with the silencer volume 20. The longitudinal stays 56 enhance lifting off of the flow from the openings 22 in the flow channel section 40 with the silencer volume 20.

Figure 5:
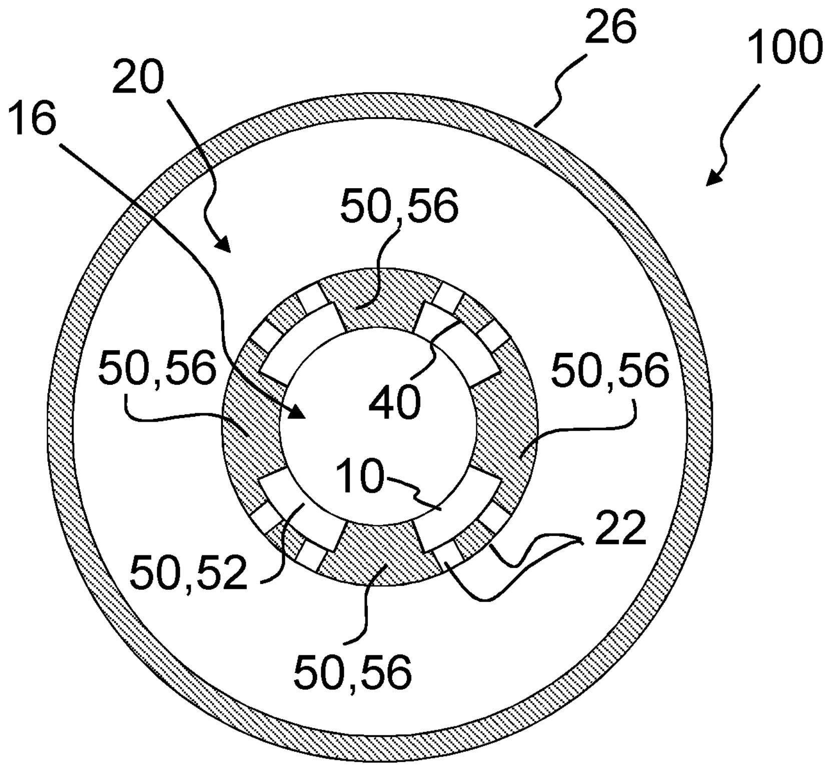
FIG. 5 shows a plan view of a section plane through an acoustic component according to a further embodiment of the invention.
Figure 6:
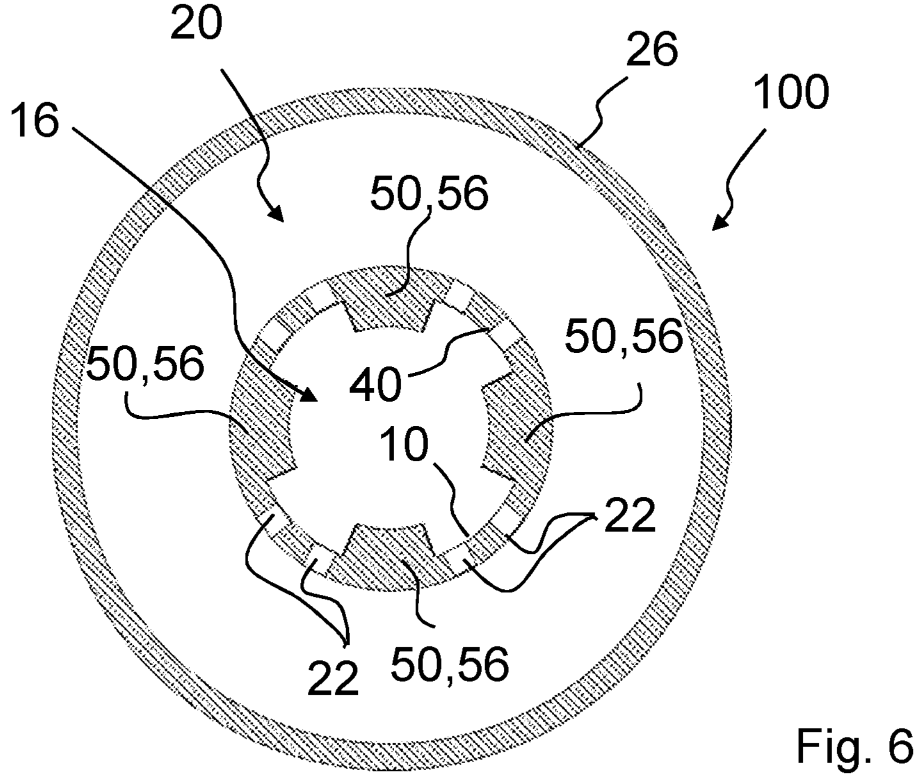
FIG. 6 shows a plan view of a section plane through an acoustic component according to a further embodiment of the invention.

FIGS. 5 and 6 show variants of an acoustic component 100 with longitudinal stays 56.

FIG. 5 shows a plan view of a section plane through an acoustic component 100 with a step 52 and four longitudinal stays 56 distributed equidistantly at the circumference of the flow channel section 40 about the longitudinal axis 60. The step 52 is interrupted by the longitudinal stays 56.

The further embodiment of the acoustic component 100 corresponds to the embodiments of FIGS. 1 through 4. The flow channel 16 comprises a larger cross section in the flow channel section 40 than in the inlet pipe 10.

FIG. 6 shows a plan view of a section plane through an acoustic component 100 in which four longitudinal stays 56, but no step 52, are provided as flow deflection device 50. The further embodiment of the acoustic component 100 corresponds to the configurations in FIGS. 1 through 4. The flow channel 16 comprises in the flow channel section 40 a smaller cross section than in the inlet pipe 10. The longitudinal stays 56 are placed essentially onto the inner radius of the flow channel 16. The inlet pipe 10 and the outlet pipe 12 can comprise the same inner radius.

Figure 7:
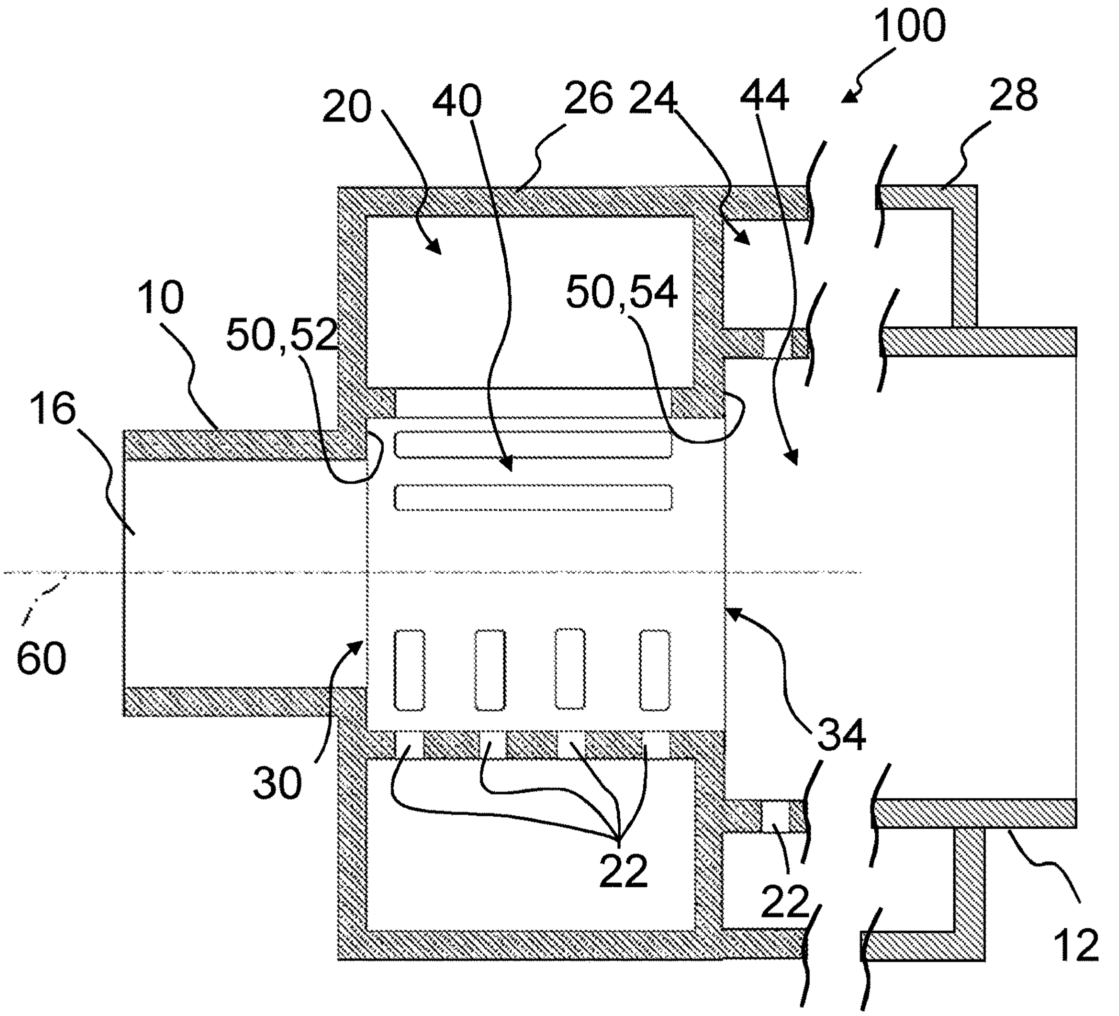
FIG. 7 shows a longitudinal section along an axial direction of an acoustic component according to a further embodiment of the invention.

FIG. 7 shows a longitudinal section along an axial direction of an acoustic component 100 according to a further embodiment of the invention.

The acoustic component 100 comprises a flow channel 16 for a fluid, in particular air, that is surrounded, for example, by cylindrical walls.

Between an inlet pipe 10 and an outlet pipe 12 of the flow channel 16, a first flow channel section 40 with a silencer volume 20 is arranged that is connected in the flow channel section 40 via openings 22 to the flow channel 16 and on which a second flow channel section 44, only partially illustrated, with a silencer volume 24 is arranged that is connected also via openings 22 to the flow channel 16. The openings 22 are identified only partially with reference characters for reasons of clarity. The flow channel 16 extends through the inlet pipe 10, the flow channel section 40 with silencer volume 20, the flow channel section 44 with silencer volume 24, and the outlet pipe 12. The silencer volume 20 is closed off outwardly by a cover 26 and the silencer volume 24 by a cover 28.

At the transition 30 of the inlet pipe 10 into the flow channel section 40 with the silencer volume 20, a flow deflection device 50 in the form of a step 52 is provided such that the diameter of the flow channel 16 is enlarged in the flow channel section 40 with the silencer volume 20.

The openings 22 are arranged in the flow channel section 40 in a sheltered zone of the flow deflection device 50 embodied as a step 52. The step 52 is arranged so as to extend circumferentially about the flow channel 16. The flow deflection device 50 is neutral in relation to the intended damping behavior of the acoustic component, i.e, designed to be substantially ineffective with respect to damping.

At the transition 34 of the flow channel section 40 into the flow channel section 44 with the silencer volume 24, a flow deflection device 50 in the form of a step 54 is provided such that the diameter of the flow channel 16 is enlarged in the flow channel section 44 with the silencer volume 24.

The openings 22 are arranged in the flow channel sections 40, 44 in a sheltered zone of the flow deflection device 50 formed as step 52, 54. The steps 52, 54 are arranged so as to extend circumferentially about the flow channel 16. The flow deflection device 50 is embodied neutral in relation to the intended damping behavior of the acoustic component, i.e., designed to be substantially ineffective with respect to damping.

The flow deflection device 50 deflects locally a flow of the fluid in the flow channel sections 40, 44 with the damping volumes 20, 24 at the transitions 30, 34 away from the openings 22 toward the center of the flow channel 16 so that the flow is lifted off of the openings and only at some axial distance from the steps 52, 54 reaches the wall of the flow channel 16 again where no openings 22 are present anymore. For this purpose, a step 52, 54 embodied with a sharp edge is particularly beneficial.

The flow deflection device 50 is oriented outwardly in this embodiment. The openings 22 comprise accordingly a larger distance to the longitudinal axis 60 in comparison to the wall of the inlet pipe 10.

Optionally, the flow deflection device 50 can however also be oriented inwardly, for example, in the form of a stay extending circumferentially or interrupted about the flow channel 16.

The height of the step or the expansion of the diameter can be adapted to the boundary conditions of the flow through the acoustic component 100 in practical use.

The outlet pipe 12 comprises the same inner diameter as the flow channel section 44 with the silencer volume 24. Optionally, the outlet pipe 12 can comprise a larger inner diameter than the flow channel section 44 with the silencer volume 24.

The outer diameters of the covers 26, 28 of the flow channel sections 40, 44 comprises the same diameter.

Figure 7A:
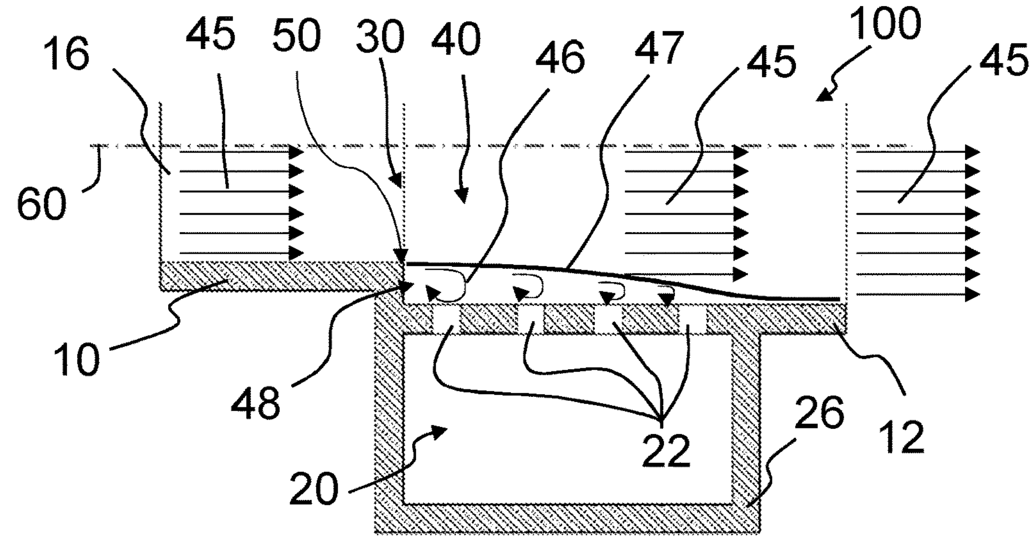
FIG. 7A shows a detail view of the longitudinal section of an acoustic component according to FIG. 1 with an illustration of the flow course.

FIG. 7A shows a detail of a longitudinal section along a longitudinal axis 60 of an acoustic component 100 according to FIG. 1. Between an inlet pipe 10 and an outlet pipe 12 of the flow channel 16, a flow channel section 40 with a silencer volume 20 is arranged that is connected in the flow channel section 40 via openings 22 to the flow channel 16.

At the transition 30 of the inlet pipe 10 into the flow channel section 40 with the silencer volume 20, a flow deflection device 50 in the form of a step 52 is provided such that the diameter of the flow channel 16 is enlarged in the flow channel section 40 with the silencer volume 20.

The openings 22 are arranged in the flow channel section 40 in a sheltered zone of the flow deflection device 50 embodied as a step 52.

The flow deflection device 50 effects a detachment of the core flow 45 from the wall surface of the flow channel 16 so that the core flow 45 flows remote from the openings 22 and only at a certain axial distance from the flow deflection device 50 contacts the wall of the flow channel 16 again where no openings 22 are existing anymore. This detachment of the flow at the flow deflection device 50, for example, by a step 52, has the result that the openings 22 in the flow channel section 40 are located outside of the core flow 45 and are not subjected to inflow. The openings 22 are arranged in the wake region 48 of the flow, also referred to as dead water region. The wake region 48 is delimited by the imaginary separation surface 47 from the core flow 45. In the wake region 48, individual swirls 46 may occur which however have no acoustic effect.

Figure 8:
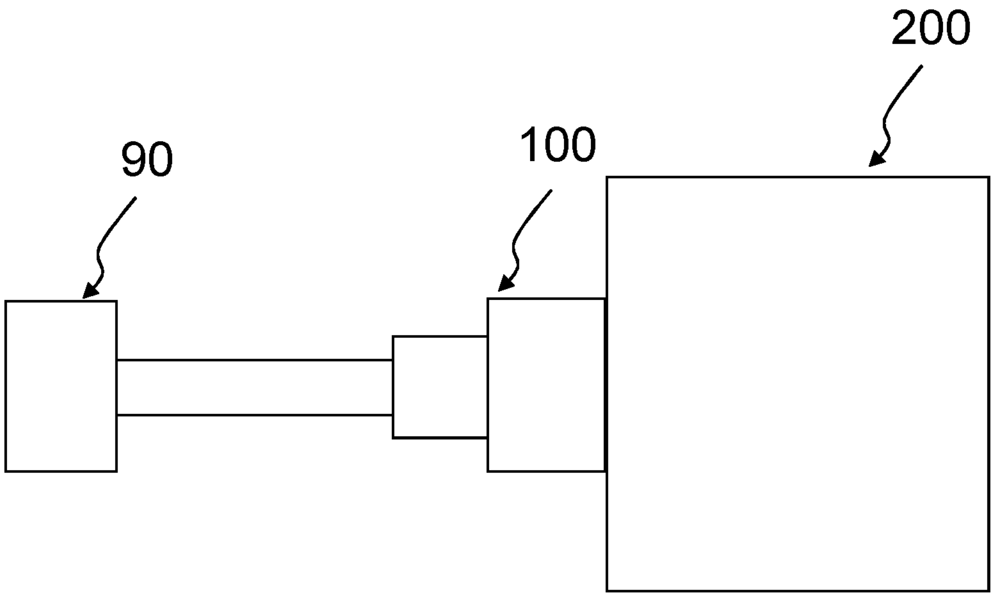
FIG. 8 shows schematically a charge air duct with an acoustic component according to an embodiment of the invention.

FIG. 8 shows schematically an air routing line 200 in the form of a charge air duct of an internal combustion engine with an acoustic component 100 according to the invention according to an embodiment of the invention. The acoustic component 100 is arranged at a clean air side of an air inlet that leads from a turbocharger 90 to the internal combustion engine. Advantageously, disturbing noises such as whistling tones can be avoided by means of the acoustic component 100, even at high flow rates of the air in the air routing line 200.

The acoustic component 100 can be positioned upstream in the low-pressure part as well as downstream of the turbocharger 90 in the high-pressure part of the air routing line.

What is claimed is:

1. An acoustic component comprising:

a flow channel for air, the flow channel comprising an inlet pipe, an outlet pipe, and a flow channel section arranged between the inlet pipe and the outlet pipe, wherein the flow channel section comprises:

a cylindrical wall radially surrounding the flow channel where the flow channel extends through the flow channel section;

a resonator chamber having an air-filled open interior, formed at a radially outer side of the cylindrical wall, the air-filled open interior of the resonator chamber forming a silencer volume, wherein the flow channel extends through the flow channel section;

wherein the silencer volume is connected to the flow channel in the flow channel section via openings formed in the cylindrical wall of the flow channel section;

a flow deflection device arranged at least in the flow channel section with the silencer volume, wherein the flow deflection device comprises at least one step, formed as a step change in a cross section of the flow channel at the at least one step and positioned upstream of the openings, the flow deflection device is configured to deflect a flow of the air in the flow channel section with the silencer volume away from the openings;

wherein the openings in the flow channel section are arranged in a sheltered zone of the flow deflection device;

wherein the flow deflection device comprises at least one longitudinal stay arranged at a radially inner side of the cylindrical wall radially surrounding the flow channel, the longitudinal stay projecting into the flow channel and extending in an axial direction along a longitudinal axis of the flow channel along the flow channel section.

2. The acoustic component according to claim 1, wherein the flow deflection device is arranged at least at a transition of the inlet pipe into the flow channel section with the silencer volume.

3. The acoustic component according to claim 1, wherein the flow deflection device is configured to be substantially ineffective with respect to damping.

4. The acoustic component according to claim 1, wherein the outlet pipe comprises the same diameter or a larger diameter than the flow channel section with the silencer volume.

5. The acoustic component according to claim 1, wherein the outlet pipe comprises the same cross section or a larger cross section than the flow channel section with the silencer volume.

6. The acoustic component according to claim 1, wherein the outlet pipe comprises the same diameter or a larger diameter than the flow channel section with the silencer volume and further comprises the same cross section or a larger cross section than the flow channel section with the silencer volume.

7. The acoustic component according to claim 1, wherein the flow channel comprises a larger diameter and/or a larger cross section in the flow channel section than in the inlet pipe.

8. The acoustic component according to claim 1, wherein the at least one step is sharp-edged.

9. The acoustic component according to claim 1, wherein the at least one step extends circumferentially about the flow channel.

10. The acoustic component according to claim 1, wherein the at least one longitudinal stay extends in the axial direction at least across an axial extension of the openings of the cylindrical wall.

11. The acoustic component according to claim 1, wherein a plurality of said at least one longitudinal stay are arranged in the flow channel section about the longitudinal axis.

12. The acoustic component according to claim 1, wherein, along a longitudinal axis of the flow channel, sequentially two or more of said flow deflection device are arranged in two or more of said flow channel section with the silencer volume.

13. An air routing line comprising an acoustic component according to claim 1 for an internal combustion engine, wherein the acoustic component is arranged at a clean air side of an air inlet or wherein the acoustic component is arranged at a raw air side of an air inlet.

* * * * *